June 6, 1967 R. R. NORLEY 3,324,343

COLOR TUBE DEGAUSSER WITH COIL ON BOTH SIDES OF SHIELD

Filed May 13, 1965

INVENTOR.
RONALD R. NORLEY
BY
W. H. Sprouagle
Attorney

United States Patent Office 3,324,343

Patented June 6, 1967

3,324,343

COLOR TUBE DEGAUSSER WITH COIL ON BOTH SIDES OF SHIELD

Ronald R. Norley, Indianapolis, Ind., assignor to Radio Corporation of America, a corporation of Delaware Filed May 13, 1965, Ser. No. 455,407
8 Claims. (Cl. 315—8)

This invention relates to apparatus for degaussing television receivers and particularly to the electromagnetic structures usable in systems for automatically degaussing a cathode ray color picture tube.

The metallic mask and its suporting structure together with other metal parts used in conjunction with a shadow mask type of color television picture tube are subject to becoming magnetized both in shipment to, and continued use in, a consumer's home. Such magnetization is effected by bringing the picture tube into proximity with magnetizing structures such as trucks, elevators and the like and also by exposure during use to influences such as the earth's magnetic field. The resultant magnetic field from such random or other magnetization often adversely affects the performance of the color television receiver in which the picture tube is embodied. The remedy for such magnetization is a degaussing of the receiver. It also has been the experience of users of such a color television apparatus (receiver) that the relocation or reorientation of the apparatus frequently required another degaussing in order to effect optimum performance in the new position.

In the past the degaussing of a color television receiver usually has been done by a serviceman. More recently, however, color television receivers have been equipped with apparatus whereby the degaussing operation is performed more or less automatically. One type of apparatus which has been successfully used for automatic degaussing comprises a shield of magnetic material and a coil structure which is suitably energized by alternating current which initially has a substantial magnitude and which subsequently diminishes effectively to zero. Such apparatus operates to remove any undesirable magnetization of the metal parts of the receiver which can adversely affect the path of the electron beams of the picture tube and to impart such magnetization to the metal parts that the beams are effectively shielded from whatever magnetic field is present.

It has not been the general practice even recently to provide automatic degaussing apparatus in color television receivers having metal cabinets because the metal cabinets provide considerable shielding. It has been found, however, that the performance of a color television receiver in a metal cabinet may be improved by the use of automatic degaussing apparatus and that such apparatus may be materially simplified compared to that previously used.

It, therefore, is an object of the present invention to provide automatic degaussing apparatus which will enable adequate shielding of the electron beams of the picture tube in a simpler and less expensive manner than heretofore effective.

Another object of the invention is to provide automatic degaussing apparatus for a color television receiver which is effective for receivers housed in metal, wooden or plastic cabinets.

In accordance with the present invention the automatic degaussing apparatus, by means of which color purity of a color television receiver is improved, comprises a shield of permeable material which envelopes the end of the picture tube housing the viewing screen and a single coil mounted on the shield and encircling the screen end of the tube. About one-half of the coil is mounted on the outside of the shield and the other half on the inside. The half that is on the outside of the shield is located forwardly of the rear end of the shield and the inside half of the coil is located adjacent to the rear end of the shield. The shield itself is mounted substantially concentrically with the viewing screen of the picture tube and the tube, when mounted in a metal cabinet, has one screen edge which is closer to one side of the cabinet than the other screen edge is to the opposite cabinet side. The periodic energization of the coil by alternating current which initially has a large amplitude but which subsequently diminishes to substantially zero is effected in degaussing not only the metal portions of the picture tube itself but also the metal cabinet in which the receiver is housed. By such means it has been found that the employment of both the degaussing shield itself and the metal cabinet, an effective degaussing of the receiver is accomplished.

A better understanding of the inveniton may be had by reference to the following description which is taken in conjunction with the accompanying drawings of which:

Figures 1, 2, 3, 4:
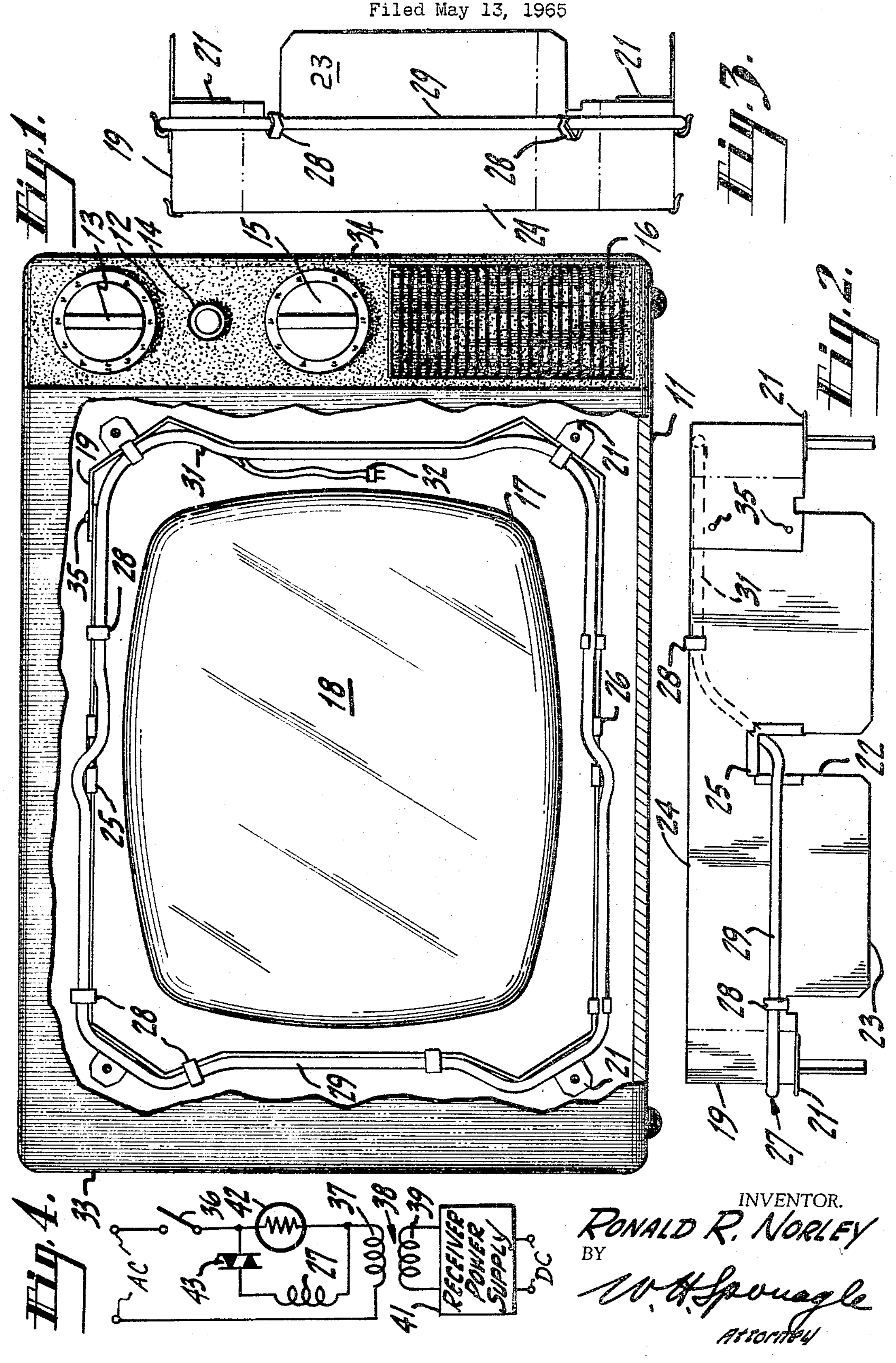
FIGURE 1 is a front elevational view of a color television receiver housed in a metal cabinet which is partially broken away to illustrate the viewing screen end of the picture tube and the degaussing shield surrounding it.
FIGURE 2 is a top view of the shield itself showing the location of the energizing coil mounted on the shield.
FIGURE 3 is a side elevational view of the shield as seen from the left side of FIGURE 1.
FIGURE 4 is a schematic circuit diagram of one arrangement by which the degaussing coil may be energized.

In FIGURE 1 a color television receiver cabinet 11 has a panel 12 at the right side of the front thereof. In this panel are mounted control knobs 13, 14 and 15 by which the receiver is adjusted. It also contains a louvered or screened portion 16 behind which is mounted a loud speaker in a conventional manner. A picture tube 17 is suitably mounted in the cabinet 11 so that its viewing screen 18 may be observed from the front of the cabinet.

A color purity shield 19 of generally rectangular shape surrounds the viewing screen end of the picture tube 17 and is mounted in the cabinet 11 by means such as a plurality of mounting lugs 21 by which to attach the shield to the front of the cabinet (not shown). As more clearly shown in FIGURE 2 the shield 19 has a slot 22 formed in the top thereof and extending from the front end 23 thereof toward the rear end 24. A similar slot is formed in the bottom of the shield. The slot 22 is lined with a grommet 25 and the lower slot also has a similar grommet 26.

A coil 27 is mounted on and supported by the shield 19 by means of a plurality of clips 28. As viewed in FIGURES 1 and 2 the left hand section 29 of the coil 27 extends around the outside of the shield 19 and the right hand section 31 of the coil extends around the inside of the right hand half of the shield 19. The coil passes through the shield between the outside to the inside through the grommets 25 and 26 which serve to protect the coil from being damaged by sharp edges. The coil, in one practical embodiment of the invention, consists of about 100 turns of wire terminating in a connector 32 by which it may be connected into an energizing circuit.

It is to be noted that the color purity or degaussing apparatus is located in the cabinet in such a way that its left hand section is closer to the left side 33 of the cabinet 11 than its right hand section is to the right side 34 of the cabinet. This locates the outside section 29 of the coil 27 in such a way that its influence, when energized, is effective both on the shield 19 and on the adjacent side 33 of the cabinet 11. The influence of the coil section 29 also extends into the left hand region of the picture tube 17. The placement of the coil section 31 on the inside of the shield 19 at the right side of the cabinet causes its influence to be felt mostly by the shield 19 and to a lesser extent by the right side 34 of the cabinet 11. The influence of the coil section 31 also extends into the right hand and central regions of the picture tube 17. Another deviation from a symmetrical arrangement are the respective placements of the outside coil section 29 forwardly of the rear end 24 of the shield 19 and of the inside coil section 31 adjacent to the shield rear end 24.

It has been found that, when color purity apparatus such as that illustrated and described is used to used to degauss the picture tube of a color television receiver housed in a metal cabinet, not only does the shield 19 function to shield the electron beams from whatever magnetic field is present in the receiver location but also the metal cabinet itself contributes toward the shielding action. When the color purity apparatus including the magnetic shield 19 and the degaussing coil 27 is used with a receiver housed in a metal cabinet the shield itself may be constructed from approximately 30 mil cold rolled steel having a carbon content of less than 1%. Such material is relatively easily cut and bent into the desired shape such as that illustrated without employing expensive drawing operations. The two ends thereof are overlapped and secured to one another by means of suitable fasteners such as rivets 35. A shield having the illustrated shape together with a degaussing coil placed thereon in the manner shown and described also may be effectively used for correcting color purity in a television receiver housed in a cabinet which is not made of metal. The described apparatus also may be used with metallic or non-metallic cabinets in which the picture tube is equally spaced from the cabinet sides. In such cases the shield 19 should be made of a material, such as silicon steel, for example, having a somewhat better magnetic characteristic than cold rolled steel.

The degaussing coil 27 may be suitably energized by alternating current having an initial amplitude of approximately four amperes and which diminishes effectively to zero in a few seconds by means of a circuit such as that shown in FIGURE 4. The coil 27 is energized by alternating current derived from terminals A.C. upon the closure of a switch 36. Such switch closure energizes the primary winding 37 of a transformer 38 so as to produce alternating current in the secondary winding 39 of the transformer. The secondary winding is connected to the power supply 40 for the television receiver. The primary winding is energized by means of a circuit including a thermistor 42. The thermistor is a device which, when cool, has a relatively high resistance but, when hot, has a relatively low resistance. The coil 27 is energized by the voltage drop across the thermistor in a circuit which includes a voltage dependent resistor 43. The voltage dependent resistor is a device which has a relatively low resistance when a high voltage is impressed across it and a relatively high resistance when the impressed voltage is low. It will be observed that the resistive properties of the thermistor 42 and the voltage dependent resistor 43 are of a reciprocal nature.

The energization of the degaussing apparatus is as follows, assuming that the thermistor 42 is cold, i.e., at room temperature. Immediately upon closure of the switch 36, which conveniently is the on-off switch of the television receiver, the current flow through the thermistor 41 to the primary winding 37 of the power supply transformer 38 produces a relatively large voltage drop across the thermistor. At this time the resistance of the voltage dependent resistor 43 is low so that alternating current flows through the coil 27 of the degaussing apparatus at considerable amplitude. As a consequence, a relatively strong alternating magnetic field is produced within the picture tube 17 by the degaussing apparatus including the coil 27 and the shield 19. As the thermistor 42 warms in response to current flow therethrough its resistance decreases, thereby decreasing the voltage drop thereacross and the amplitude of the alternating current applied to the flux generating coil 27. As a result of the decreased voltage the resistance of the voltage dependent resistor 43 increases, thereby decreasing the current flow through the coil 27. As a consequence, the strength of the alternating magnetic field produced by the degaussing apparatus decreases at a rate determined by the characteristics of the thermistor 42, the voltage dependent resistor 43, the alternating current voltage and the receiver load. The thermistor 42 ultimately heats sufficiently that its resistance and the voltage drop thereacross are very small. The resultant voltage applied to the voltage dependent resistor 43 is so small that the current through it and the coil 27 is of negligible value. Full alternating current voltage is applied to the receiver power supply 41 enabling it to supply the direct current for the operation of the television receiver. The coil 27, being effectively deenergized, produces no further significant magnetic field within the picture tube. At this point the metallic structures of the color picture tube 17 and associated magnetic elements such as the metal cabinet 11 are effectively demagnetized. The shield 19 and the metal cabinet 11, thereafter, function only to provide a shielding effect from the earth's and other undesired magnetic fields.

Apparatus in accordance with this invention has been successfully used in a color television receiver provided with a 19″ (diagonal) rectangular color picture tube having 90° beam deflection mounted in a cabinet substantially as shown in FIGURE 1. In this case the shield 19 as shown in this figure had an overall horizontal dimension of approximately 17″, a vertical dimension of approximately 14″ and a diagonal dimension of approximately 21″. The depth of the shield as viewed in FIGURES 2 and 3 was approximately 5″ and the top slot 22 and its bottom counterpart extended approximately 3″ inwardly from the front end 23 of the shield 19. The outside section 29 of the coil 27 was placed approximately midway between the front and back ends 23 and 24, respectively, of the shield 19 and the inside coil section 31 was placed closely adjacent to the rear end 24 of the shield. The spacing between the degaussing apparatus and the left side 33 of the cabinet 11 was approximately 3″ and the spacing from the right side 34 of the cabinet was approximately 6″.

What is claimed is:

1. Color purity correcting apparatus for a multicolor television picture tube including a viewing screen at one end thereof, said apparatus being adapted for energization periodically by alternating current of a magnitude which initially is appreciable and which diminishes effectively to zero, comprising in combination:
  - a shield of permeable material envelopng the screen end of said picture tube and extending toward the rear of said tube; and
  - a single coil encircling the screen end of said tube,
  - a first portion of said coil extending around the outside of said shield and a second portion of said coil extending around the inside of said shield.

2. Color purity correcting apparatus as defined in claim 1 in which one of said coil portions is located forwardly of the rear end of said shield and the other of said coil portions is located adjacent said shield rear end.

3. Color purity correcting apparatus for a multicolor television picture tube including a viewing screen at one end thereof, said apparatus being adapted for energization periodically by alternating current of a magnitude which initially is appreciable and which diminishes effectively to zero, comprising in combination:
  - a metal cabinet housing said picture tube;
  - a shield of permeable material enveloping the screen end of said picture tube within said cabinet and extending toward the rear of said tube and cabinet; and
  - a single coil having a plurality of conductors and encircling the screen end of said tube,
  - a first portion of said coil extending around the outside of said shield and a second portion of said coil extending around the inside of said shield.

4. Color purity correcting apparatus as defined in claim 3 in which said first coil portion is located forwardly of the rear end of said shield and said second coil portion is located adjacent said shield rear end.

5. Color purity correcting apparatus for a multicolor television picture tube incluing a viewing screen at one end thereof, said apparatus being adapted for energization periodically by alternating current of a magnitude which initially is appreciable and which diminishes effectively to zero, comprising in combination:

a metal cabinet housing said picture tube;

a shield of permeable material enveloping the screen end of said picture tube and extending toward the rear of said tube, one side of said shield being closer to one cabinet side than to the other cabinet side; and a single coil having a plurality of conductors and encircling the screen end of said tube, a first portion of said coil extending around the outside of that part of said shield including said one shield side and a second portion of said coil extending around the inside of said shield.

6. Color purity correcting apparatus as defined in claim 5 in which said first coil portion is located forwardly of the rear end of said shield and said second coil portion is located adjacent said shield rear end.

7. Color purity correcting apparatus for a multicolor television picture tube including a viewing screen at one end thereof, said apparatus being adapted for energization periodically by alternating current of a magnitude which initially is appreciable and which diminishes effectively to zero, comprising in combination:

a metal cabinet housing said picture tube with one edge of said viewing screen closer to one cabinet side than to the opposite cabinet side;

a shield of permeable material enveloping the screen end of said picture tube and extending toward the rear of said tube; and a single coil having a plurality of conductors and encircling the screen end of said tube, a first portion of said coil extending around the outside of that part of said shield enveloping said one screen edge and a second portion of said coil extending around the inside of said shield.

8. Color purity correcting apparatus as defined in claim 7 in which said first coil portion is located forwardly of the rear end of said shield and said second coil portion is located adjacent to said shield rear end.

No references cited.

JAMES W. LAWRENCE, *Primary Examiner.*

R. SEGAL, *Assistant Examiner.*